United States Patent
Fang et al.

(10) Patent No.: US 11,122,595 B2
(45) Date of Patent: Sep. 14, 2021

(54) INFORMATION SENDING METHOD AND APPARATUS, TERMINAL AND STORAGE MEDIUM

(71) Applicant: ZTE CORPORATION, Guangdong (CN)

(72) Inventors: Huiying Fang, Shenzhen (CN); Bo Dai, Shenzhen (CN); Kun Liu, Shenzhen (CN); Weiwei Yang, Shenzhen (CN)

(73) Assignee: Xi'an Zhongxing New Software Co., Ltd., Xi'an (CN)

( * ) Notice: Subject to any disclaimer, the term of this patent is extended or adjusted under 35 U.S.C. 154(b) by 63 days.

(21) Appl. No.: 16/497,180

(22) PCT Filed: Mar. 23, 2018

(86) PCT No.: PCT/CN2018/080342
§ 371 (c)(1),
(2) Date: Sep. 24, 2019

(87) PCT Pub. No.: WO2018/171760
PCT Pub. Date: Sep. 27, 2018

(65) Prior Publication Data
US 2020/0100271 A1   Mar. 26, 2020

(30) Foreign Application Priority Data
Mar. 24, 2017 (CN) .......................... 201710184568.7

(51) Int. Cl.
*H04W 72/12* (2009.01)
*H04W 4/80* (2018.01)
(Continued)

(52) U.S. Cl.
CPC ..... *H04W 72/1263* (2013.01); *H04J 13/0048* (2013.01); *H04J 13/0062* (2013.01);
(Continued)

(58) Field of Classification Search
CPC .......... H04W 56/001; H04W 74/0833; H04W 76/27; H04W 36/06; H04W 76/19;
(Continued)

(56) References Cited

U.S. PATENT DOCUMENTS

2017/0064743 A1* 3/2017 Lei .................... H04W 74/0833
2017/0180001 A1* 6/2017 Wang .................. H04W 74/002
(Continued)

FOREIGN PATENT DOCUMENTS

WO    2017/014606 A1    1/2017
WO    WO 2018/175042 A1   9/2018

OTHER PUBLICATIONS

International Search Report of Application No. PCT/CN2018/080342—4 pages (dated Jun. 15, 2018).
(Continued)

*Primary Examiner* — Jung Liu
(74) *Attorney, Agent, or Firm* — Knobbe, Martens, Olson & Bear, LLP (57) ABSTRACT

Provided are an information transmission method and apparatus, a terminal and a storage medium. The method includes: determining a transmission resource for a physical signal/a physical channel corresponding to a scheduling request; and transmitting the physical signal/the physical channel on the transmission resource, where the scheduling request is used for requesting resource allocation for data transmission.

19 Claims, 3 Drawing Sheets determine a transmission resource for a physical signal/a physical channel corresponding to a scheduling request — 101 transmit the physical signal / the physical channel on the transmission resource — 102

(51) Int. Cl.
*H04J 13/00* (2011.01)
*H04L 5/00* (2006.01)
*H04W 72/04* (2009.01)
*H04W 74/08* (2009.01)
*H04W 80/08* (2009.01)

(52) U.S. Cl.
CPC .......... *H04L 5/0055* (2013.01); *H04L 5/0094* (2013.01); *H04W 4/80* (2018.02); *H04W 72/0493* (2013.01); *H04W 74/0833* (2013.01); *H04W 80/08* (2013.01)

(58) Field of Classification Search
CPC ............. H04W 72/0453; H04W 56/00; H04W 36/0079; H04W 74/006; H04W 74/004; H04W 74/0841; H04L 5/0007; H04B 1/713
See application file for complete search history.

(56) References Cited

U.S. PATENT DOCUMENTS

| | | | |
|---|---|---|---|
| 2017/0324587 A1* | 11/2017 | Lin | H04L 27/2675 |
| 2018/0376531 A1* | 12/2018 | Martinez Tarradell | H04W 76/10 |
| 2019/0089504 A1* | 3/2019 | Hwang | H04L 5/0007 |
| 2019/0097853 A1* | 3/2019 | Suzuki | H04L 27/3444 |
| 2019/0132808 A1* | 5/2019 | Tsuboi | H04W 56/001 |
| 2019/0132809 A1* | 5/2019 | Tsuboi | H04W 56/001 |
| 2019/0191454 A1* | 6/2019 | Blankenship | H04W 74/006 |
| 2019/0387508 A1* | 12/2019 | Park | H04W 72/042 |
| 2020/0260429 A1* | 8/2020 | Blankenship | H04L 5/0053 |

OTHER PUBLICATIONS

Sharp, "R1-162836, A/N Resource Indication for NB-IoT", 3GPP TSG RAN WG1 Meeting #84bis—(Apr. 15, 2016).
Ericsson, "R1-162779, NB-IoT-Remaining Issues for NPRACH", 3GPP TSG RAN WG1 Meeting #84-bis—(Apr. 15, 2016).
Ericsson: "NB-IoT—Uplink control information", 3GPP TSG-RAN1—Ad Hoc NB-IoT—RI-161875, Sophia Antipolis, France; Mar. 22-24, 2016, XP051080992.
Intel Corporation: "DL gaps and remaining details of timing relationships for NB-IoT", 3GPP TSG RAN WG1 Meeting #84bis—RI-162973, Busan, South Korea; Apr. 11-15, 2016, XP051080732.
Nokia et al., "Scheduling Request Multiplexing with ACK/NACK", 3GPP TSG-RAN WG1 Meeting #86—RI-166593, Gothenburg, Sweden; Aug. 22-26, 2016, XP051132531.
Supplementary European Search Report for EP 18770872 dated Nov. 20, 2020.

* cited by examiner

INFORMATION SENDING METHOD AND APPARATUS, TERMINAL AND STORAGE MEDIUM

CROSS-REFERENCES TO RELATED APPLICATIONS

This application is a U.S. National Stage Application, filed under 35 U.S.C. 371, of International Patent Application No. PCT/CN2018/080342, filed on Mar. 23, 2018, which claims a priority to a Chinese patent application No. 201710184568.7 filed on Mar. 24, 2017, disclosure of which are incorporated herein by reference in their entireties.

TECHNICAL FIELD

The present disclosure relates to the field of communications and, in particular, to an information transmission method and apparatus, a terminal and a storage medium.

BACKGROUND

To meet the requirements of a Cellular Internet of Things (C-IoT), a technical solution of a NarrowBand-Cellular Internet of Things (NB-IoT) is formulated by the 3rd Generation Partnership Project (3GPP) organization. The NB-IoT system focuses on radio frequency access technologies with low complexity and low throughput, whose main research objects include an improved indoor coverage, a massive number of low-throughput user equipment, low delay sensitivity, ultra-low equipment costs, low equipment power consumption and a network architecture.

In the NB-IoT system solution currently formulated, a dedicated scheduling request is not supported. If the terminal needs to transmit data and does not establish a valid narrowband uplink service channel (NPUSCH), it needs to transmit a data request, i.e., a scheduling request by a random access request process.

However, for the NB-IoT system, the number of NB-IoT terminals is large and service models of the terminals are similar, and uplink data requests have high concurrency. Transmitting the data requests by the random access request processes will have great impact on the NB-IoT system, and the probability of collision is high.

Therefore, how to transmit the scheduling requests with high efficiency and low collision rate in the NB-IoT system is an urgent problem to be solved.

SUMMARY

Embodiments of the present disclosure provide an information transmission method and apparatus, a terminal and a storage medium.

Solutions of the embodiments of the present disclosure are implemented as described below.

The embodiments of the present disclosure provide an information transmission method. The method includes: determining a transmission resource for a physical signal/a physical channel corresponding to a scheduling request; transmission the physical signal/the physical channel on the transmission resource; where the scheduling request is used for requesting a resource allocation for data transmission.

The embodiments of the present disclosure further provide an information transmission apparatus. The apparatus includes: a determination unit, which is configured to determine a transmission resource for a physical signal/a physical channel corresponding to a scheduling request; a transmission unit, which is configured to transmit the physical signal/the physical channel on the transmission resource; where the scheduling request is used for requesting a resource allocation for data transmission.

The embodiments of the present disclosure further provide a terminal. The terminal includes: a processor, which is configured to determine a transmission resource for a physical signal/a physical channel corresponding to a scheduling request; a communication interface, which is configured to transmit the physical signal/the physical channel on the transmission resource; where the scheduling request is used for requesting a resource allocation for data transmission.

In the above solution, the processor is configured to: determine that a transmission resource of acknowledgement/non-acknowledgement (ACK/NACK) further serves as the transmission resource of the physical signal/the physical channel; or determine the transmission resource of the physical signal/the physical channel in a manner of high-layer signaling configuration.

In the above solution, the processor is configured to: determine whether a collision exists between a transmission resource of acknowledgement/non-acknowledgement (ACK/NACK) and a configured transmission resource of the physical signal/the physical channel; in a case that the collision exists, determining the transmission resource of the physical signal/the physical channel according to a collision resolution strategy.

The embodiments of the present disclosure further provide a storage medium configured to store computer-executable instructions for executing any method described above when executed by a processor.

The information transmission method and apparatus, the terminal and the storage medium provided by the embodiments of the present disclosure determine the transmission resource of the physical signal/the physical channel corresponding to the scheduling request; transmit the physical signal/the physical channel on the transmission resource; and the scheduling request is used for requesting the transmission resource of allocated data. Since the physical signal/physical channel is used for transmission the scheduling request instead of transmission the scheduling request by the random access process, the collision problem brought by using one preamble sequence by multiple terminals is avoided, and the scheduling request is able to be transmitted effectively with a low collision rate, which greatly increases the probability of successful transmission.

BRIEF DESCRIPTION OF DRAWINGS

In the drawings (which are not necessarily drawn to scale), similar reference numerals in the drawings may denote similar components in different figures.

DETAILED DESCRIPTION

Hereinafter the present disclosure will be further described in detail in conjunction with the drawings and embodiments.

The uplink and downlink transmission bandwidths of the NB-IoT system are both 180 kHz, which are the same as the bandwidth of a physical resource block (PRB) in the Long Term Evolution (LTE) system, which is advantageous for the NB-IoT system to reuse related designs of the existing LTE system. In addition, the NB-IoT system supports three different operation modes: (1) a stand-alone operation which, for example, uses a frequency spectrum used by the GSM EDGE Radio Access Network (GERAN) system to replace one or more GSM carriers, where the EDGE is the Enhanced Data rate for GSM Evolution; (2) a guard-band operation which, for example, uses an unused resource block within an LTE carrier guard-band range; and (3) an in-band operation which, for example, uses a resource block within a normal LTE carrier range.

In the current formulated NB-IoT system solution, when the terminal is established with a NPUSCH channel, the terminal is able to carry a Buffer Status Report (BSR) in the NPUSCH channel to notify a base station of allocating new NPUSCH resources. But if the terminal has not established a valid NPUSCH channel, a data request needs to be transmitted by a random access request process. However, in the random access process, the terminal randomly selects a preamble sequence to initiate the random access process to a network side. If multiple terminals use the same preamble sequence to initiate random access processes at the same time, collision may occur. However, for the NB-IoT system, the number of NB-IoT terminals is large and service models of the terminals are similar, so uplink data requests have high concurrency. Therefore, transmission of the data requests through the random access request processes will have great impact on the NB-IoT system, and the probability of collision is high.

On this basis, in various embodiments of the present disclosure, a transmission resource for a physical signal/a physical channel corresponding to a scheduling request is determined, and the physical signal/the physical channel is transmitted on the transmission resource, where the scheduling request is used for requesting a resource allocation for data transmission.

Due to using the physical signal/the physical channel to transmit the scheduling request instead of transmission the scheduling request by the random access process, the collision problem caused by using one preamble sequence by multiple terminals is avoided, and the scheduling requests are able to be transmitted effectively with low collision rate, which greatly increases the probability of successful transmission. That is, by transmitting the scheduling request through the physical signal/the physical channel to the base station, the collision rate is low, the latency is smaller when compared with the random access process, and the collision and congestion problems of initiating the scheduling requests by a large number of NB-IoT terminals in the NB-IoT system through the random access processes are solved.

Embodiment One

Figure 1:
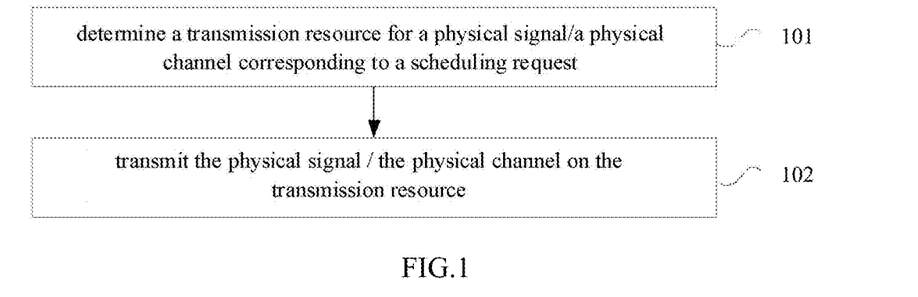
FIG. 1 is a schematic flowchart of an information transmission method according to embodiment one of the present disclosure.

An information transmission method of an embodiment of the present disclosure is applied to a terminal. As shown in FIG. 1, the method includes steps described below.

In step 101, the terminal determines a transmission resource for a physical signal/a physical channel corresponding to a scheduling request.

Here, a sequence of the physical signal is one of the following: a Zadoff Chu (ZC) sequence; a Walsh sequence + the ZC sequence; the Walsh sequence + an orthogonal cover code (OCC) sequence; an NPRACH sequence; and a sequence transmitting an ACK/NACK signal in a NarrowBand-Cellular Internet of Things (NB-IoT).

The ZC sequence of the physical signal may be a sequence with a computer search length of 28, or may be a sequence with a length of 28 shortened from a ZC sequence with a length of 29, or may be a sequence obtained by repeating a ZC sequence with a length of 7 for 4 times, or may be a sequence obtained by repeating a sequence with a length of 14 for two times, where the sequence with the length of 14 is constituted by adding one element to a ZC sequence with a length of 13 in a manner of cyclic shift.

Here, if the sequence of the physical signal is the ZC sequence, during transmitting the physical signal, interference randomization between cells is performed by using a root sequence group.

In the Walsh sequence + the ZC sequence of the physical signal, a length of the Walsh sequence is 16, a length of the ZC sequence is 12; during transmitting the physical signal, the Walsh sequence and the ZC sequence are multiplexed in the transmission resource of the physical signal in a time-division manner.

In the Walsh sequence + the OCC sequence of the physical signal, a length of the Walsh sequence is 4, the OCC sequence is a 3rd order OCC sequence; the Walsh sequence + the OCC sequence of the physical signal is a sequence generated by repeating a combination sequence for four times, the combination sequence is combined by a 4th order Walsh sequence and the 3rd order OCC sequence in a time-division manner.

If the sequence of the physical signal is one of: the Walsh sequence + the ZC sequence; the Walsh sequence + the OCC sequence; the NPRACH sequence; and the sequence transmitting the ACK/NACK signal in the NB-IoT; when transmitting the physical signal, a scrambling process is performed on the physical signal by using a pseudo noise (PN) sequence or a Gold sequence.

The step in which the terminal determines the transmission resource of the physical signal/the physical channel corresponding to the scheduling request includes that:

the terminal determines that a transmission resource of acknowledgement/non-acknowledgement (ACK/NACK) further serves as the transmission resource of the physical signal/the physical channel.

In practice, the terminal may determine the transmission resource of the physical signal/the physical channel in a manner of high-layer signaling configuration.

The step of determining the transmission resource of the physical signal/the physical channel in the manner of the high-layer signaling configuration includes: configuring the transmission resource of the physical signal/the physical channel by a configuration parameter carried on a radio resource control (RRC) signaling; and the configuration parameter includes at least one of the following: a time domain transmission period of the physical signal/the physical channel; a time domain offset in the transmission period of the physical signal/the physical channel; a frequency domain subcarrier position of the physical signal/the physical channel; or a repetition factor N of the physical signal/the physical channel, where N is an integer greater than or equal to 1.

Here, in practice, in case of configuring the transmission resource of the physical signal/the physical channel by the configuration parameter, if the configuration parameter does not include the frequency domain subcarrier position of the physical signal/the physical channel, the frequency domain subcarrier position is determined to be a fixed or pre-defined default value.

In case of configuring the transmission resource of the physical signal/the physical channel by the configuration parameter, the frequency domain subcarrier position of the physical signal/the physical channel is determined by using subcarrier offset information of 1, 2, 3, 4, or 6 bits.

In case of configuring the transmission resource of the physical signal/the physical channel by the configuration parameter, if the subcarrier spacing is 3.75 kHz, the frequency domain subcarrier position $I_f$ of the physical signal/the physical channel is determined to be one of the following: $I_f = 37$ − a subcarrier offset; $I_f = 45$ − the subcarrier offset; $I_f = 46$ − the subcarrier offset; $I_f =$ the subcarrier offset. If the subcarrier spacing is 15 kHz, the frequency domain subcarrier position of the physical signal/the physical channel is determined to be one of the following: $I_f = 4$ + the subcarrier offset; $I_f =$ the subcarrier offset; $I_f = 11$ − the subcarrier offset.

In step 102, the terminal transmits the physical signal/the physical channel on the transmission resource.

Specifically, the terminal transmits the physical signal/the physical channel to a base station.

Here, the scheduling request is used for requesting a resource allocation for data transmission.

In practice, the physical signal/the physical channel satisfies at least one of the following characteristics: occupying one subcarrier in frequency domain, i.e., using a transmission mode of a single tone; or an occupied time domain length being equal to a product of a minimum time domain length and a repetition factor N.

The minimum time domain length may satisfy one of the following characteristics: for a subcarrier spacing of 15 kHz, the minimum time domain length occupied by the physical signal/the physical channel is 1 ms or 2 ms; for a subcarrier spacing of 3.75 kHz, the minimum time domain length occupied by the physical signal/the physical channel is 2 ms, 4 ms, 6 ms or 8 ms; for the subcarrier spacing of 3.75 kHz, the minimum time domain length occupied by the physical signal is a length of at least one narrowband physical random access channel (NPRACH) symbol group; where a length of the NPRACH symbol group is equal to a sum of a length of a cyclic prefix and a length of five orthogonal frequency division multiplexing symbols.

In practice, the length of the at least one NPRACH symbol group may be a length of 1, 2 or 4 NPRACH symbol groups.

In an embodiment, the specific implementation of the step 101 may further include: determining whether a collision exists between a transmission resource of acknowledgement/non-acknowledgement (ACK/NACK) and the configured transmission resource of the physical signal/the physical channel; when the collision exists, determining the transmission resource of the physical signal/the physical channel according to a collision resolution strategy.

Specifically, when a size of the configured transmission resource of the physical signal/the physical channel is same as that of the transmission resource of an ACK/NACK signal, a time domain position of the transmission resource of the physical signal/the physical channel of the request is aligned with a time domain position of the transmission resource of the ACK/NACK signal, and downlink data is received, the terminal determines the transmission resource of the physical signal/the physical channel to be the transmission resource of the ACK/NACK signal.

Correspondingly, in step 102, the terminal simultaneously carries the ACK/NACK signal and the physical signal/the physical channel on the transmission resource of the ACK/NACK signal corresponding to the downlink data; and modulates the ACK/NACK signal and the physical signal/the physical channel needed to be transmitted by using quadrature phase shift keying (QPSK) or Π/4-QPSK.

For the base station, firstly the physical signal/the physical channel is detected on the configured transmission resource of the physical signal/the physical channel. If the base station detects the physical signal/the physical channel on the configured transmission resource of the physical signal/the physical channel, an ACK/NACK signal modulated by Π/2 Binary Phase Shift Keying (BPSK) is detected on the transmission resource of the ACK/NACK signal. If the base station does not detect the physical signal/the physical channel on the configured transmission resource of the physical signal/the physical channel, then a scheduling request signal and an ACK/NACK which are jointly coded and modulated by the Π/4-QPSK or the QPSK are detected on the transmission resource of the ACK/NACK signal.

Here, when the size of the configured transmission resource of the physical signal/the physical channel is same as that of the transmission resource of the ACK/NACK signal, the time domain position of the transmission resource of the physical signal/the physical channel of the request is aligned with the time domain position of the transmission resource of the ACK/NACK signal, and downlink data fails to be received, the terminal determines the transmission resource of the physical signal/the physical channel to be the configured transmission resource.

Correspondingly, in step 102, the terminal transmits the physical signal/the physical channel on the configured transmission resource.

In practice, the physical signal/the physical channel may be transmitted only when the ACK/NACK signal is being transmitted. In this case, the ACK/NACK signal and the physical signal/the physical channel are transmitted together.

On this basis, in one embodiment, the specific implementation of the step 101 may further include that:

when a size of the configured transmission resource of the physical signal/the physical channel is same as that of the transmission resource of an ACK/NACK signal, a time domain position of the transmission resource of the physical signal/the physical channel of the request is aligned with a time domain position of the transmission resource of the ACK/NACK signal, and the transmission resource of the physical signal/the physical channel is determined to be the transmission resource of the ACK/NACK signal.

Correspondingly, in the step 102, when the downlink data is received, simultaneously carrying the ACK/NACK signal and the physical signal/the physical channel on the transmission resource of the ACK/NACK signal corresponding to the downlink data; and modulating the ACK/NACK signal and the physical signal/the physical channel needed to be transmitted by using the quadrature phase shift keying (QPSK) or the Π/4-QPSK.

In an embodiment, the specific implementation of the step 101 may further include: in a case that the configured transmission resource of the physical signal/the physical channel is partially overlapped with the transmission resource of the ACK/NACK signal in time domain, and the downlink data is received, determining to transmit the ACK/NACK signal on the transmission resource of the ACK/NACK signal corresponding to the downlink data and discarding the physical signal/the physical channel.

Here, when the configured transmission resource of the physical signal/the physical channel is partially overlapped with the transmission resource of the ACK/NACK signal in time domain, and the downlink data fails to be received, the transmission resource of the physical signal/the physical channel is determined to be the configured transmission resource.

Correspondingly, in the step 102, the physical signal/the physical channel is transmitted on the configured transmission resource.

In practice, when the transmission resource of the physical signal/the physical channel is not configured and the scheduling request is needed, a timer is started. Before the timer expires, if no ACK/NACK signal is transmitted, the scheduling request is transmitted by triggering a random access process.

Here, a duration of the timer may be configured as needed.

When transmitting the physical channel, each slot for transmitting the physical channel is constituted by six data symbols and one pilot symbol.

The information transmission method provided by the embodiment of the present disclosure determines the transmission resource of the physical signal/the physical channel corresponding to the scheduling request; transmits the physical signal/the physical channel on the transmission resource; and the scheduling request is used for requesting a resource allocation for data transmission. Since the physical signal/physical channel is used for transmission the scheduling request instead of transmission the scheduling request by the random access process, and the scheduling request is able to be transmitted effectively with a low collision rate, which greatly increases the probability of successful transmission. That is, by transmitting the scheduling request by the physical signal/the physical channel to the base station, the collision rate is low, and the latency is smaller compared with that in the random access process, the collision and congestion problem of initiating the scheduling request by a large number of NB-IoT terminals in the NB-IoT system through the random access process.

In addition, the transmission resource of the physical signal/the physical channel is determined in a manner of high-layer signaling configuration, or it is determined that a transmission resource of acknowledgement/non-acknowledgement (ACK/NACK) further serves as the transmission resource of the physical signal/the physical channel, or whether a collision exists between a transmission resource of acknowledgement/non-acknowledgement (ACK/NACK) and the configured transmission resource of the physical signal/the physical channel is determined. When the collision exists, the transmission resource of the physical signal/the physical channel is determined according to a collision resolution strategy. Through these specific determination modes, the scheduling request is able to be further transmitted effectively with a low collision rate, thereby further reducing the latency.

Embodiment Two

Figure 2:
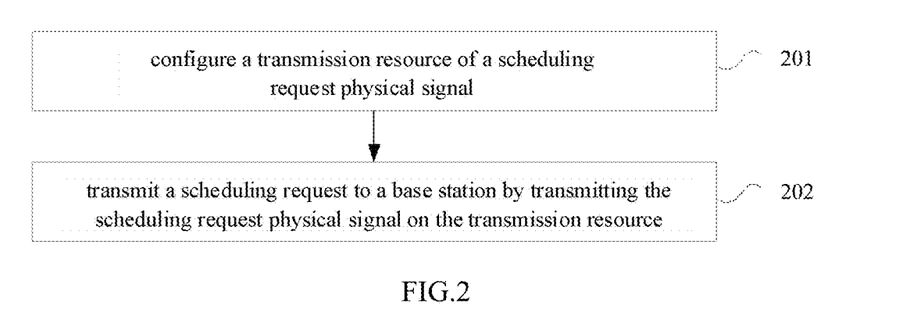
FIG. 2 is a schematic flowchart of a scheduling request transmission method according to embodiment two of the present disclosure.

The embodiment provides a scheduling request transmission method. FIG. 2 is a flowchart of a scheduling request transmission method according to an embodiment of the present disclosure. As shown in FIG. 2, the method includes the steps described below.

In step 201, a terminal configures a transmission resource of a scheduling request physical signal.

In step 202, a terminal transmits a scheduling request to a base station by transmitting the scheduling request physical signal on the transmission resource.

The scheduling request physical signal occupies one subcarrier in frequency domain, i.e., the transmission mode of the scheduling request physical signal is a single tone transmission mode. A time domain length occupied by the scheduling request physical signal = a minimum time domain length × repetition factor N, where N is an integer greater than or equal to 1. For a subcarrier spacing of 15 kHz, the minimum time domain length occupied by the scheduling request physical signal is 1 ms or 2 ms (four slots, each slot includes seven OFDM symbols). For a subcarrier spacing of 3.75 kHz, the minimum time domain length occupied by the scheduling request physical signal is 2 ms, 4 ms, 6 ms or 8 ms (four slots, each slot includes seven OFDM symbols).

The terminal configures the transmission resource of the scheduling request physical signal by a transmission position configuration parameter carried on a RRC signaling. The configuration parameter includes at least one of the following: a time domain transmission period of the scheduling request physical signal; a time domain offset in the transmission period of the scheduling request physical signal; a frequency domain subcarrier position of the scheduling request physical signal; a repetition factor of the scheduling request physical signal; and a sequence number of the scheduling request physical signal.

Here, in practice, if the transmission position configuration parameter of the scheduling request physical signal does not include the frequency domain subcarrier position of the scheduling request physical signal, the frequency domain subcarrier position adopts a fixed or pre-defined default value. If the transmission position configuration parameter of the scheduling request physical signal does not include the repetition factor N, the repetition factor N of the scheduling request physical signal adopts a fixed or pre-defined default value, the default value is 1.

In practice, the frequency domain subcarrier position of the scheduling request physical signal is indicated by using subcarrier offset information of 1, 2 or 3 bits. For the subcarrier spacing of 3.75 kHz, the frequency domain subcarrier position of the scheduling request physical signal: $I_f = 37$ − a subcarrier offset; $I_f = 45$ − the subcarrier offset; $I_f = 46$ − the subcarrier offset; or $I_f =$ the subcarrier offset.

For the subcarrier spacing of 15 kHz, the frequency domain subcarrier position of the scheduling request physical signal: $I_f = 4$ + the subcarrier offset; $I_f =$ the subcarrier offset; or $I_f = 11$ − the subcarrier offset.

On the configured transmission resource of the scheduling request physical signal, the scheduling request physical signal of a single user exclusively occupies the resource or scheduling request physical signals of multiple users are multiplexed on the resource.

Here, the scheduling request physical signal is one of the following sequences.

1. ZC Sequence

Specifically, the ZC sequence is a sequence with a computer search length of 28, or a sequence with a length of 28 shortened from a ZC sequence with a length of 29, or may be a sequence obtained by repeating a ZC sequence with a length of 7 for 4 times, or may be a sequence obtained by repeating a sequence with a length of 14 for two times, where the sequence with the length of 14 is constituted by adding one element to a ZC sequence with a length of 13 in a manner of cyclic shift.

2. A Walsh Sequence + the ZC Sequence

Figure 3:
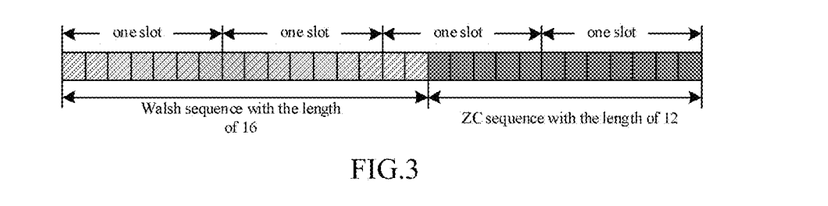
FIG. 3 is a schematic structural diagram of a scheduling request physical signal according to embodiment two of the present disclosure.

Specifically, a length of the Walsh sequence is 16 and a length of the ZC sequence is 12. As shown in FIG. 3, it is a sequence formed by multiplexing of the Walsh sequence and the ZC sequence in the scheduling request physical signal in a time-division manner.

3. The Walsh Sequence + the ZC Sequence

Figure 4:
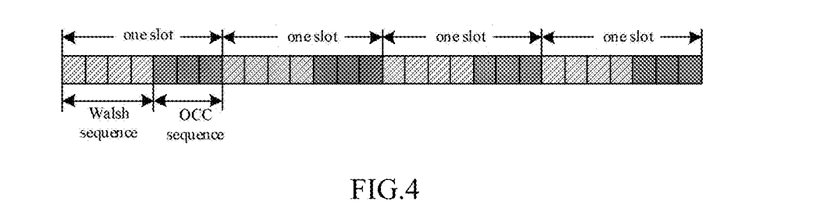
FIG. 4 is another schematic structural diagram of a scheduling request physical signal according to embodiment two of the present disclosure.

Specifically, a length of the Walsh sequence is 4 and the ZC sequence is a 3rd order OCC sequence. As shown in FIG. 4, it is a sequence of the scheduling request physical signal generated by repeating a combination sequence for four times, the combination sequence is combined by a 4th order Walsh sequence and the 3rd order OCC sequence in a time-division manner.

4. A Sequence Transmitting an ACK/NACK Signal in a NB-IoT

Here, in practice, if the scheduling request physical signal is the ZC sequence, interference randomization between cells is performed by a root sequence group.

If the scheduling request physical signal is the Walsh sequence + the ZC sequence, or the Walsh sequence + an OCC sequence, then scrambling is performed on the physical signal by using a pseudo noise (PN) sequence or a Gold sequence.

Through the method described in this embodiment, the NB-IoT terminal transmits the scheduling request by the scheduling request physical signal to the base station, the collision rate is low, and the latency is smaller compared with that in the random access process, the collision and congestion problem of initiating the scheduling request by a large number of NB-IoT terminals in the NB-IoT system through the random access process.

Embodiment Three

Figure 5:
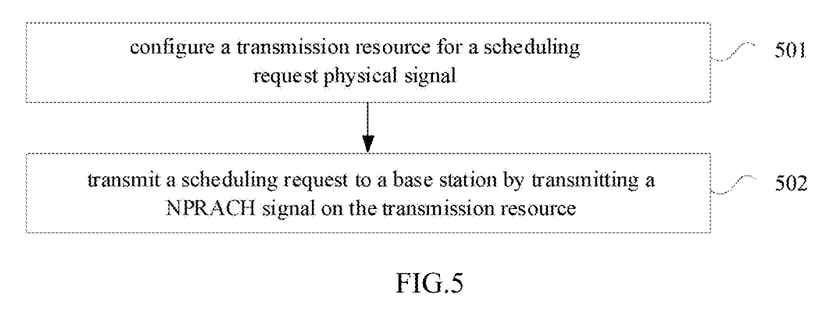
FIG. 5 is a schematic flowchart of a scheduling request transmission method according to embodiment three of the present disclosure.

The embodiment provides a scheduling request transmission method. FIG. 5 is a flowchart of a scheduling request transmission method according to an embodiment of the present disclosure. As shown in FIG. 5, the method includes the steps described below.

In step 501, a terminal configures a transmission resource of a scheduling request physical signal.

In step 502, the terminal transmits a scheduling request to a base station by transmitting a NPRACH signal on the transmission resource.

That is, the scheduling request physical signal is the NPRACH signal.

The scheduling request physical signal occupies one subcarrier on the frequency domain, i.e., the transmission mode of the scheduling request physical signal is a single tone transmission mode. A subcarrier spacing is 3.75 kHz. A time domain length occupied by the scheduling request physical signal = a minimum time domain length × a repetition factor N. The minimum time domain length occupied by the scheduling request physical signal is a length of one or more NPRACH symbol groups, which preferably is 1, 2 or 4 NPRACH symbol groups.

Here, the length of the NPRACH symbol group = a length of CP + a length of five OFDM symbols.

The terminal configures the transmission resource of the scheduling request physical signal by a transmission position configuration parameter carried on a RRC signaling. The configuration parameter includes at least one of the following: a time domain transmission period of the scheduling request physical signal; a time domain offset in the transmission period of the scheduling request physical signal; a frequency domain subcarrier position of the scheduling request physical signal; a repetition factor of the scheduling request physical signal.

Here, in practice, if the transmission position configuration parameter of the scheduling request physical signal does not include the frequency domain subcarrier position of the scheduling request physical signal, the frequency domain subcarrier position adopts a fixed or pre-defined default value. If the transmission position configuration parameter of the scheduling request physical signal does not include the repetition factor N, the repetition factor N of the scheduling request physical signal adopts a fixed or pre-defined default value, the default value is 1.

Here, in practice, the frequency domain subcarrier position of the scheduling request physical signal is indicated by using subcarrier offset information of 1, 2 or 3 bits. A frequency domain subcarrier position of the scheduling request physical signal; $I_f = 37$ – a subcarrier offset; $I_f = 45$ – the subcarrier offset; $I_f = 46$ – the subcarrier offset; or If = the subcarrier offset.

On the configured transmission position of the scheduling request physical signal, the scheduling request physical signal of a single user exclusively occupies the resource position or scheduling request physical signals of multiple users are multiplexed in the resource position. When the scheduling request physical signals of multiple users are multiplexed at the same resource position, the sequence number of the scheduling request physical signal needs to be further configured.

The scheduling request signal is a NPRACH sequence.

Through the method described in this embodiment, the NB-IoT terminal transmits the scheduling request by transmitting the NPRACH sequence at a pre-configured resource position, the collision rate is low, and the latency is smaller compared with that in the current random access process, the collision and congestion problem of initiating the scheduling request by a large number of NB-IoT terminals in the NB-IoT system through the random access process.

Embodiment Four

Figure 6:
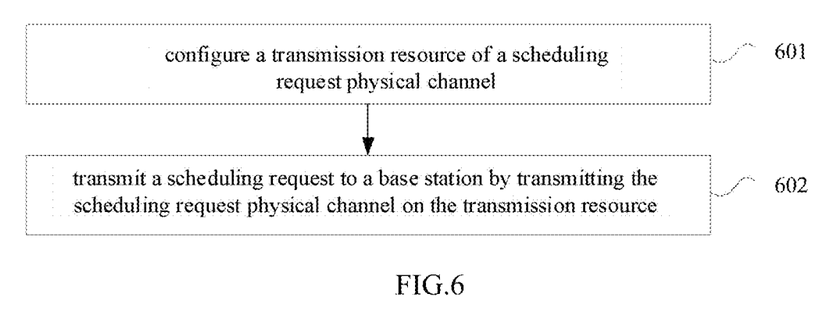
FIG. 6 is a schematic flowchart of a scheduling request transmission method according to embodiment four of the present disclosure.

The embodiment provides another scheduling request transmission method. FIG. 6 is a flowchart of a scheduling request transmission method according to an embodiment of the present disclosure. As shown in FIG. 6, the method includes the steps described below.

In step 601, a terminal configures a transmission resource of a scheduling request physical channel.

In step 602, a terminal transmits a scheduling request to a base station by transmitting the scheduling request physical channel on the transmission resource.

The scheduling request physical channel occupies one subcarrier in frequency domain, i.e., the transmission mode of the scheduling request physical channel is a single tone transmission mode. A time domain length occupied by the scheduling request physical channel=a minimum time domain length × repetition factor N, where N is an integer greater than or equal to 1. For a subcarrier spacing of 15 kHz, the minimum time domain length occupied by the scheduling request physical channel is 1 ms or 2 ms (four slots, each slot includes seven OFDM symbols). For a subcarrier spacing of 3.75 kHz, the minimum time domain length occupied by the scheduling request physical channel is 2 ms, 4 ms, 6 ms or 8 ms (four slots, each slot includes seven OFDM symbols).

Here, the terminal configures the transmission resource of the scheduling request physical channel by a transmission position configuration parameter carried by a RRC signaling. The configuration parameter includes at least one of the following: a time domain transmission period of the scheduling request physical channel; a time domain offset in the transmission period of the scheduling request physical channel; a frequency domain subcarrier position of the scheduling request physical channel; or a repetition factor N of the scheduling request physical channel.

Here, in practice, if the transmission position configuration parameter of the scheduling request physical channel does not include the frequency domain subcarrier position of the scheduling request physical channel, the frequency domain subcarrier position adopts a fixed or pre-defined default value.

Here, in practice, the frequency domain subcarrier position of the scheduling request physical channel is indicated by using offset information of subcarriers of 1, 2 or 3 bits. For the subcarrier spacing of 3.75 kHz, the frequency domain subcarrier position of the scheduling request physical channel: $I_f = 37$ − a subcarrier offset; $I_f = 45$ − the subcarrier offset; $I_f = 46$ − the subcarrier offset; or $I_f =$ the subcarrier offset.

For the subcarrier spacing of 15 kHz, the frequency domain subcarrier position of the scheduling request physical channel: $I_f = 4 +$ the subcarrier offset; $I_f =$ the subcarrier offset; or $I_f = 11$ − the subcarrier offset.

On the configured transmission position of the scheduling request physical channel, the scheduling request physical channel of a single user exclusively occupies the resource position or scheduling request physical channels of multiple users are multiplexed in the resource position.

The scheduling request physical channel is constituted by data+pilot.

In practice, when the scheduling request is transmitted, the data+pilot signals are transmitted on the scheduling request physical channel. When no scheduling request is transmitted, the data+pilot signals are not transmitted.

Each slot is constituted by six data symbols+one pilot symbol.

Through the method described in this embodiment, the NB-IoT terminal transmits the scheduling request by the scheduling request physical channel to the base station, the collision rate is low, and the latency is smaller compared with that in the random access process, the collision and congestion problem of initiating the scheduling request by a large number of NB-IoT terminals in the NB-IoT system through the random access process.

Embodiment Five

Figure 7:
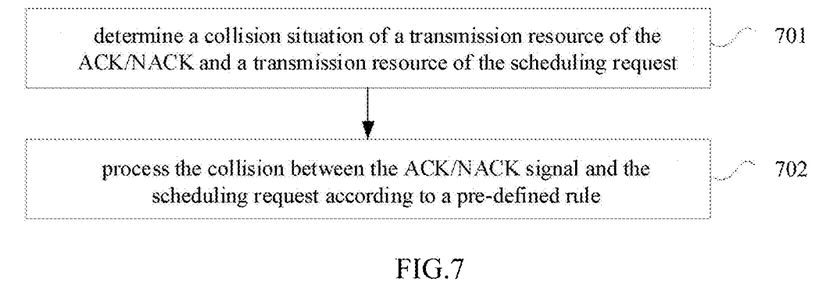
FIG. 7 is a schematic flowchart of processing a collision between an ACK/NACK signal and a scheduling request according to embodiment five of the present disclosure.

The embodiment provides a scheduling request transmission method. FIG. 7 is a flowchart of a processing procedure for a collision between an ACK/NACK signal and a scheduling request according to an embodiment of the present disclosure. As shown in FIG. 7, the method includes the steps described below.

In step 701: the terminal determines a collision situation of a transmission resource of the ACK/NACK and a transmission resource of the scheduling request.

In step 702, the collision between the ACK/NACK signal and the scheduling request is processed according to a pre-defined rule.

Here, the pre-defined rule further includes one of: when the size of the configured transmission resource of the scheduling request physical signal/the physical channel is same as that of the resource of the ACK/NACK signal, the time domain position of the transmission resource of the scheduling request physical signal/the physical channel is aligned with the time domain position of the transmission resource of the ACK/NACK signal, and the terminal receives the downlink data, the terminal simultaneously carries the ACK/NACK signal and the scheduling request on the transmission resource of the ACK/NACK signal corresponding to the downlink data, and modulates the scheduling request and the ACK/NACK signal needs to be transmitted by using the QPSK or the Π/4-QPSK. If the terminal does not receive the downlink data, the terminal transmits the scheduling request on the transmission resource of the configured scheduling request physical signal/the physical channel.

For a base station, when the size of the configured transmission resource of the scheduling request physical signal/the physical channel is same as that of the resource of the ACK/NACK signal, the time domain position of the transmission resource of the scheduling request physical signal/the physical channel is aligned with the time domain position of the transmission resource of the ACK/NACK signal, the base station firstly detects the scheduling request on the configured transmission resource of the scheduling request physical signal/the physical channel. If the base station detects the scheduling request on the configured transmission resource of the scheduling request physical signal/the physical channel, it shows that the scheduling request physical signal/the physical channel is not jointly transmitted with the ACK/NACK signal on the transmission resource of the ACK/NACK signal, the transmission resource of the ACK/NACK only carries the ACK/NACK signal, in this case, the base station detects the ACK/NACK signal modulated by the Π/2-BPSK on the transmission resource of the ACK/NACK signal. If the base station does not detect the scheduling request on the configured transmission resource of the scheduling request physical signal/the physical channel, it shows that the scheduling request physical signal/the physical channel is jointly transmitted with the ACK/NACK signal on the transmission resource of the ACK/NACK signal, in this case, the base station detects a scheduling request signal and the ACK/NACK signal that are jointly coded and modulated by the Π/4-QPSK or the QPSK on the transmission resource of the ACK/NACK signal.

When the configured transmission resource of the scheduling request physical signal/the physical channel is partially overlapped with the transmission resource of the ACK/NACK signal on a time domain, if the terminal receives the downlink data, the terminal transmits the ACK/NACK signal on the transmission resource of the ACK/NACK signal corresponding to the downlink data, and discards the scheduling request; otherwise, the terminal transmits the scheduling request on the configured transmission resource of the scheduling request physical signal/the physical channel.

When the transmission resource of the scheduling request physical signal/the physical channel is not configured and the terminal has the scheduling request, the timer starts timing, during a period from the timer starting timing to the timer exceeding a threshold, when the terminal does not transmit the ACK/NACK signal, then the terminal transmits the scheduling request information by triggering a random access request process.

Through the method described in this embodiment, the NB-IoT terminal transmits the scheduling request by the scheduling request physical signal/the physical channel to the base station at a pre-configured resource position and combining the resource situation of the ACK/NACK signal, the collision rate is low, and the latency is smaller compared with that in the random access process, the collision and congestion problem of initiating the scheduling request by a large number of NB-IoT terminals in the NB-IoT system through the random access process.

Embodiment Six

Figure 8:
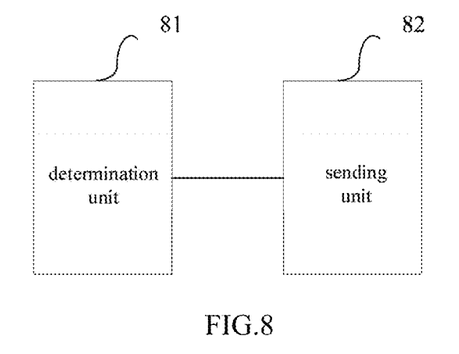
FIG. 8 is a schematic structural diagram of an information transmission apparatus according to embodiment six of the present disclosure.

To implement the method in the embodiment of the present disclosure, this embodiment provides an information transmission apparatus. As shown in FIG. 8, the apparatus includes: a determination unit 81, which is configured to determine a transmission resource for a physical signal/a physical channel corresponding to a scheduling request; and a transmission unit 82, which is configured to transmit the physical signal/the physical channel on the transmission resource; the scheduling request is used for requesting a resource allocation for data transmission.

In an embodiment, the determination unit 81 is further configured to: determine that a transmission resource of acknowledgement/non-acknowledgement (ACK/NACK) further serves as the transmission resource of the physical signal/the physical channel; or determine the transmission resource of the physical signal/the physical channel in a manner of high-layer signaling configuration.

In an embodiment, the determination unit 81 is further configured to: determine whether a collision exists between a transmission resource of acknowledgement/non-acknowledgement (ACK/NACK) and the configured transmission resource of the physical signal/the physical channel; when the collision exists, determining the transmission resource of the physical signal/the physical channel according to a collision resolution strategy.

It should be understood by those skilled in the art that implementation of functions of various units of the information transmission apparatus in FIG. 8 may be understood with reference to the related description of the foregoing information transmission method.

In practice, the determination unit 81 may be implemented by a processor in the information transmission apparatus. The transmission unit 82 may be implemented by a communication interface in the information transmission apparatus.

Figure 9:
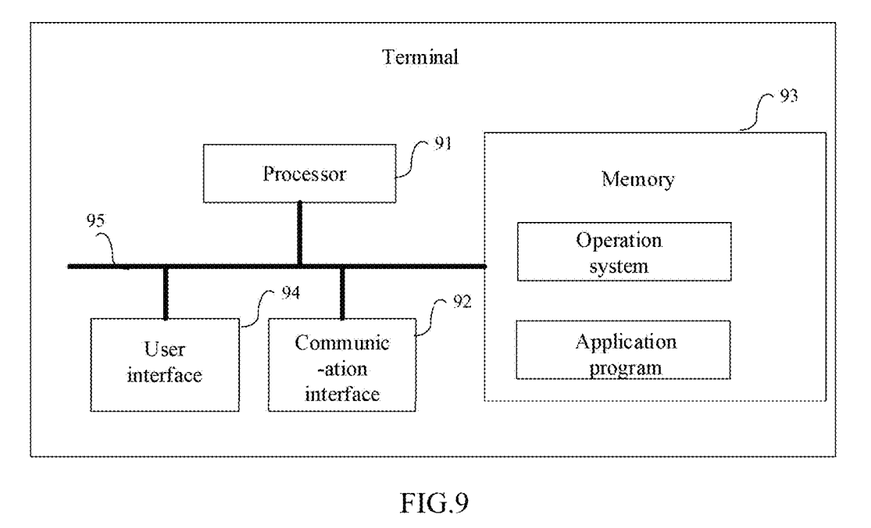
FIG. 9 is a schematic structural diagram of a terminal according to embodiment six of the present disclosure.

To implement the method described in the embodiment of the present disclosure, the embodiment provides a terminal. As shown in FIG. 9, the terminal includes: a processor 91, which is configured to determine a transmission resource for a physical signal/a physical channel corresponding to a scheduling request; and a communication interface 92, which is configured to transmit the physical signal/the physical channel on the transmission resource; the scheduling request is used for requesting a resource allocation for data transmission.

In an embodiment, the processor 91 is further configured to: determine that a transmission resource of acknowledgement/non-acknowledgement (ACK/NACK) further serves as the transmission resource of the physical signal/the physical channel; or determine the transmission resource of the physical signal/the physical channel in a manner of high-layer signaling configuration.

In an embodiment, the processor 91 is further configured to: determine whether collision exists between a transmission resource of acknowledgement/non-acknowledgement (ACK/NACK) and the configured transmission resource of the physical signal/the physical channel; when the collision exists, determining the transmission resource of the physical signal/the physical channel according to a collision resolution strategy.

It is to be understood by those skilled in the art that implementation of functions of various units of the terminal of FIG. 9 may be understood with reference to the description of the foregoing information transmission method.

Of course, in practice, the terminal may also include a memory 93, a user interface 94 and a bus system 95.

The user interface 94 may include a display, a keyboard, a button, or a click device (e.g., a mouse, a trackball, a touch pad, or a touch screen, etc.).

The memory 93 may be a volatile memory or a non-volatile memory, or may include both the volatile memory and the non-volatile memory. The memory 93 may store an operation system and application programs.

Various components in the terminal are coupled together by the bus system 95. That is, the bus system 95 is configured to implement connection communications among these components.

In practice, the processor 91 needs to read information in the memory 93, and implements functions of the processor in combination with hardware of the processor.

It should be understood by those skilled in the art that the embodiments of the present disclosure may be provided as methods, systems or computer program products. Therefore, the present disclosure may be implemented by hardware, software, or a combination of hardware and software. In addition, the present disclosure may take the form of a computer program product implemented in one or more computer-usable storage media (including, but not limited to, a disk memory and an optical memory) that includes computer-usable program codes.

The present disclosure is described with reference to flowcharts and/or block diagrams of methods, devices (systems) and computer program products according to the embodiments of the present disclosure. It should be understood that computer program instructions may implement each flow and/or block in the flowcharts and/or block diagrams and a combination of flows and/or blocks in the flowcharts and/or block diagrams. These computer program instructions may be provided to a general-purpose computer, a special-purpose computer, an embedded processor or a processor of another programmable data processing device to produce a machine so that instructions executed by a computer or the processors of other programmable data processing devices produce the apparatus for implementing functions designated in one or more flows in the flowcharts and/or one or more blocks in the block diagrams.

These computer program instructions may also be stored in a computer-readable memory which can cause the computer or other programmable data processing devices to operate in a particular manner so that the instructions stored in the computer-readable memory produce a manufactured product including an instructing apparatus. The instructing apparatus implements the functions designated in the one or more flows in the flowcharts and/or the one or more blocks in the block diagrams.

These computer program instructions may also be loaded onto the computer or another programmable data processing device so that a series of operation steps are performed on the computer or another programmable device to produce processing implemented by the computer. Therefore, instructions executed on the computer or another programmable device provide steps for implementing the functions specified in one or more flows in the flowcharts and/or one or more blocks in the block diagrams.

On this basis, the embodiment of the present disclosure further provides a storage medium, which is specifically a computer-readable storage medium and configured to store computer programs for executing steps of the method in the embodiment of the present disclosure when executed by a processor.

The above are only preferred embodiments of the present disclosure and are not intended to limit the scope of the present disclosure.

INDUSTRIAL APPLICABILITY

Solutions provided in the embodiments of the present disclosure determine the transmission resource of the physical signal/the physical channel corresponding to the scheduling request;

transmit the physical signal/the physical channel on the transmission resource; and the scheduling request is used for requesting the transmission resource of allocated data. Since the physical signal/physical channel is used for transmitting the scheduling request instead of transmitting the scheduling request by the random access process, the collision problem brought by using one preamble sequence by multiple terminals is avoided, and the scheduling request is able to be transmitted effectively with a low collision rate, which greatly increases the probability of successful transmission.

What is claimed is:

1. An information transmission method, comprising:
    determining a transmission resource for a physical signal or a physical channel corresponding to a scheduling request; and
    transmitting the physical signal or the physical channel on the transmission resource, wherein the scheduling request is used for requesting a resource allocation for data transmission;
    wherein, the determining the transmission resource for the physical signal or the physical channel corresponding to the scheduling request comprises:
    in response to a collision between a transmission resource of an ACK/NACK and a configured transmission resource of the physical signal or the physical channel, determining the transmission resource of the physical signal or the physical channel to be the transmission resource of the ACK/NACK signal; and
    wherein the transmitting the physical signal or the physical channel on the transmission resource comprises:
    in response to the transmission resource of the physical signal or the physical channel being the transmission resource of the ACK/NACK signal, simultaneously carrying the ACK/NACK signal and the physical signal or the physical channel on the transmission resource of the ACK/NACK signal; and modulating the ACK/NACK signal and the physical signal or the physical channel needed to be transmitted by using quadrature phase shift keying (QPSK) orHII/4-QPSK.

2. The method of claim 1, wherein the physical signal or the physical channel satisfies at least one of following characteristics:
    occupying one subcarrier in frequency domain; or
    an occupied time domain length being equal to a product of a minimum time domain length and a repetition factor N, where N is an integer greater than or equal to 1.

3. The method of claim 2, wherein the minimum time domain length satisfies one of following conditions:
    for a subcarrier spacing of 15 kHz, the minimum time domain length occupied by the physical signal or the physical channel is 1ms or 2 ms;
    for a subcarrier spacing of 3.75 kHz, the minimum time domain length occupied by the physical signal or the physical channel is 2 ms, 4 ms, 6 ms or 8 ms; and
    for the subcarrier spacing of 3.75 kHz, the minimum time domain length occupied by the physical signal is a length of at least one narrowband physical random access channel (NPRACH) symbol group; wherein a length of the NPRACH symbol group is equal to a sum of a length of a cyclic prefix and a length of five orthogonal frequency division multiplexing symbols.

4. The method of claim 1, wherein the determining the transmission resource of the physical signal or the physical channel corresponding to the scheduling request comprises:
    determining the transmission resource of the physical signal or the physical channel in a manner of high-layer signaling configuration.

5. The method of claim 4, wherein the determining the transmission resource of the physical signal or the physical channel corresponding to the scheduling request in the manner of the high-layer signaling configuration comprises:
    configuring the transmission resource of the physical signal or the physical channel by a configuration parameter carried on a radio resource control (RRC) signaling;
    wherein the configuration parameter comprises at least one of:
        a time domain transmission period of the physical signal or the physical channel;
        a time domain offset in the transmission period of the physical signal or the physical channel;
        a frequency domain subcarrier position of the physical signal or the physical channel; or
        a repetition factor N of the physical signal or the physical channel, where N is an integer greater than or equal to 1.

6. The method of claim 5, wherein in case of configuring the transmission resource of the physical signal or the physical channel by the configuration parameter, if the configuration parameter does not comprise the frequency domain subcarrier position of the physical signal or the physical channel, the frequency domain subcarrier position is determined to be a fixed or pre-defined default value.

7. The method of claim 5, wherein in case of configuring the transmission resource of the physical signal or the physical channel by the configuration parameter, the frequency domain subcarrier position of the physical signal or the physical channel is determined by using subcarrier offset information of 1, 2, 3, 4, or 6 bits.

8. The method of claim 5, wherein in case of configuring the transmission resource of the physical signal or the physical channel by the configuration parameter, if a subcarrier spacing is 3.75 kHz, the frequency domain subcarrier position $I_f$ of the physical signal or the physical channel is determined to be one of the following:

$$I_f=37\text{-a subcarrier offset}; I_f=45\text{-the subcarrier offset}; I_f=46\text{-the subcarrier offset; and } I_f=\text{the subcarrier offset; or}$$

in case of configuring the transmission resource of the physical signal or the physical channel by the configuration parameter, if the subcarrier spacing is 15 kHz, the frequency domain subcarrier position If of the physical signal or the physical channel is determined to be one of the following:

$I_f$=4+the subcarrier offset;$I_f$=the subcarrier offset; and
$I_f$=11−the subcarrier offset.

9. The method of claim 1, wherein a sequence of the physical signal is one of:
a Zadoff Chu (ZC) sequence; a Walsh sequence + the ZC sequence; the Walsh sequence + an orthogonal cover code (OCC) sequence; an NPRACH sequence; a sequence transmitting an ACK/NACK signal in a NarrowBand-Cellular Internet of Things (NB-IoT).

10. The method of claim 9, wherein the ZC sequence of the physical signal is a sequence with a computer search length of 28, or a sequence with a length of 28 shortened from a ZC sequence with a length of 29, or a sequence obtained by repeating a ZC sequence with a length of 7 for 4 times, or a sequence obtained by repeating a sequence with a length of 14 for two times, wherein the sequence with the length of 14 is constituted by adding one element to a ZC sequence with a length of 13 in a manner of cyclic shift.

11. The method of claim 9, wherein in the Walsh sequence + the ZC sequence of the physical signal, a length of the Walsh sequence is 16, a length of the ZC sequence is 12; and wherein when transmitting the physical signal, the Walsh sequence and the ZC sequence are multiplexed in the transmission resource of the physical signal in a time-division manner.

12. The method of claim 9, wherein in the Walsh sequence + the OCC sequence of the physical signal, a length of the Walsh sequence is 4, the OCC sequence is a 3rd order OCC sequence; and the Walsh sequence + the OCC sequence of the physical signal is a sequence generated by repeating a combination sequence for four times, wherein the combination sequence is combined by a 4th order Walsh sequence and the 3rd order OCC sequence in a time-division manner.

13. The method of claim 9, wherein in a case that the sequence of the physical signal is the ZC sequence, interference randomization between cells is performed by using a root sequence group when transmitting the physical signal.

14. The method of claim 9, wherein the sequence of the physical signal is one of: the Walsh sequence + the ZC sequence, the Walsh sequence + the OCC sequence, the NPRACH sequence, and the sequence transmitting the ACK/NACK signal in the NB-IoT; and when transmitting the physical signal, a scrambling process is performed on the physical signal by using a pseudo noise (PN) sequence or a Gold sequence.

15. The method of claim 1, wherein each slot for transmitting the physical channel is constituted by six data symbols and one pilot symbol.

16. The method of claim 1, wherein in response to a collision between a transmission resource of an ACK/NACK and a configured transmission resource of the physical signal or the physical channel, the determining the transmission resource of the physical signal or the physical channel to be the transmission resource of the ACK/NACK signal comprises:
in a case where a size of the configured transmission resource of the physical signal or the physical channel is same as that of the transmission resource of the ACK/NACK signal, a time domain position of the transmission resource of the physical signal or the physical channel of the request is aligned with a time domain position of the transmission resource of the ACK/NACK signal, and downlink data is received, determining the transmission resource of the physical signal or the physical channel to be the transmission resource of the ACK/NACK signal corresponding the downlink data; and
in a case where the size of the configured transmission resource of the physical signal or the physical channel is same as that of the transmission resource of the ACK/NACK signal, the time domain position of the transmission resource of the physical signal or the physical channel of the request is aligned with the time domain position of the transmission resource of the ACK/NACK signal, and downlink data fails to be received, determining the transmission resource of the physical signal or the physical channel to be the configured transmission resource; and
wherein the transmitting the physical signal or the physical channel on the transmission resource comprises:
in response to the transmission resource of the physical signal or the physical channel being the configured transmission resource, transmitting the physical signal or the physical channel on the configured transmission resource.

17. The method of claim 16, further comprising:
in a case where the transmission resource of the physical signal or the physical channel is not configured and the scheduling request is needed, starting a timer, and transmitting the scheduling request by triggering a random access process if no ACK/NACK signal is transmitted before the timer expires.

18. A terminal, comprising:
a processor, which is configured to determine a transmission resource for a physical signal or a physical channel corresponding to a scheduling request; and
a communication interface, which is configured to transmit the physical signal or the physical channel on the transmission resource; wherein the scheduling request is used for requesting a resource allocation for data transmission;
wherein, the processor is further configured to: in response to a collision between a transmission resource of an ACK/NACK and a configured transmission resource of the physical signal or the physical channel, determine the transmission resource of the physical signal or the physical channel to be the transmission resource of the ACK/NACK signal;
wherein the communication interface is further configured to: in response to the transmission resource of the physical signal or the physical channel being the transmission resource of the ACK/NACK, simultaneously carry the ACK/NACK signal and the physical signal or the physical channel on the transmission resource of the ACK/NACK signal, and modulate the ACK/NACK signal and the physical signal or the physical channel needed to be transmitted by using quadrature phase shift keying (QPSK) or Π/4-QPSK.

19. An information transmission method, comprising:
determining a transmission resource for a physical signal or a physical channel corresponding to a scheduling request; and
transmitting the physical signal or the physical channel on the transmission resource, wherein the scheduling request is used for requesting a resource allocation for data transmission;
wherein the determining the transmission resource of the physical signal or the physical channel corresponding to the scheduling request comprises:

in response to a collision between a transmission resource of an ACK/NACK and a configured transmission resource of the physical signal or the physical channel, determining the transmission resource of the physical signal or the physical channel;

wherein the determining the transmission resource of the physical signal or the physical channel comprises:

in a case where the configured transmission resource of the physical signal or the physical channel is partially overlapped with the transmission resource of the ACK/NACK signal in time domain, and downlink data is received, determining to transmit the ACK/NACK signal on the transmission resource of the ACK/NACK signal corresponding to the downlink data and discard the physical signal or the physical channel; or in a case where the configured transmission resource of the physical signal or the physical channel is partially overlapped with the transmission resource of the ACK/NACK signal in time domain, and downlink data fails to be received, determining the transmission resource of the physical signal or the physical channel to be the configured transmission resource; and wherein the transmitting the physical signal or the physical channel on the transmission resource comprises:

transmitting the physical signal or the physical channel on the configured transmission resource.

* * * * *

UNITED STATES PATENT AND TRADEMARK OFFICE
CERTIFICATE OF CORRECTION

PATENT NO. : 11,122,595 B2
APPLICATION NO. : 16/497180
DATED : September 14, 2021
INVENTOR(S) : Huiying Fang et al.

Page 1 of 1

It is certified that error appears in the above-identified patent and that said Letters Patent is hereby corrected as shown below:

In the Specification

In Column 10, Line 27, delete "If" and insert --$I_f$--.

In the Claims

In Column 15, Claim 1, Line 57, delete "orHΠ/4" and insert --or Π/4--.

In Column 16, Claim 3, Line 3, delete "1ms" and insert --1 ms--.

In Column 16, Claim 8, Line 61, delete "offset;$I_f$" and insert --offset; $I_f$--.

In Column 16, Claim 8, Lines 61-62, delete "offset;$I_f$" and insert --offset; $I_f$--.

In Column 16, Claim 8, Line 67, delete "If" and insert --$I_f$--.

In Column 17, Claim 8, Line 4 (Approx.), delete "offset;$I_f$" and insert --offset; $I_f$--.

In Column 18, Claim 17, Line 24, delete "16" and insert --1--.

Signed and Sealed this
Seventh Day of December, 2021

Drew Hirshfeld
*Performing the Functions and Duties of the
Under Secretary of Commerce for Intellectual Property and
Director of the United States Patent and Trademark Office*